May 10, 1938.  J. MALY  2,117,099

HEADLIGHT

Filed July 3, 1937

WITNESS:

JOSEPH MALY.
INVENTOR.

BY

ATTORNEYS.

Patented May 10, 1938

2,117,099

UNITED STATES PATENT OFFICE 2,117,099

HEADLIGHT

Joseph Maly, Old Bridge, N. J.

Application July 3, 1937, Serial No. 151,795

3 Claims. (Cl. 240—41.35)

This invention relates to headlights for motor vehicles and constitutes an improvement over the headlight set forth in my prior U. S. Letters Patent No. 1,915,193, granted June 20, 1933.

The primary object of this invention is to provide a headlight which may be used for night driving of a motor vehicle under favorable visibility to properly illuminate the road ahead, and which may be converted into a headlight to project colored light when foggy atmospheric conditions exist.

In my prior patent above referred to, I substituted a colored glass plate for a clear one when foggy driving conditions arose, which necessitated the driver stopping the vehicle and manually interchanging the glass plates, one for the other depending upon atmospheric conditions. This loss of time and labor is eliminated by this invention, for an immediate changing of the headlight beam from a clear beam for normal conditions to a colored beam for foggy conditions may be controlled by the switching on of certain electric lamps which are controlled by the lighting switch of the motor vehicle.

Other features of construction distinguishing from my prior patent will be apparent as the following specification is read in conjunction with the accompanying drawing, in which.

Figure 1:
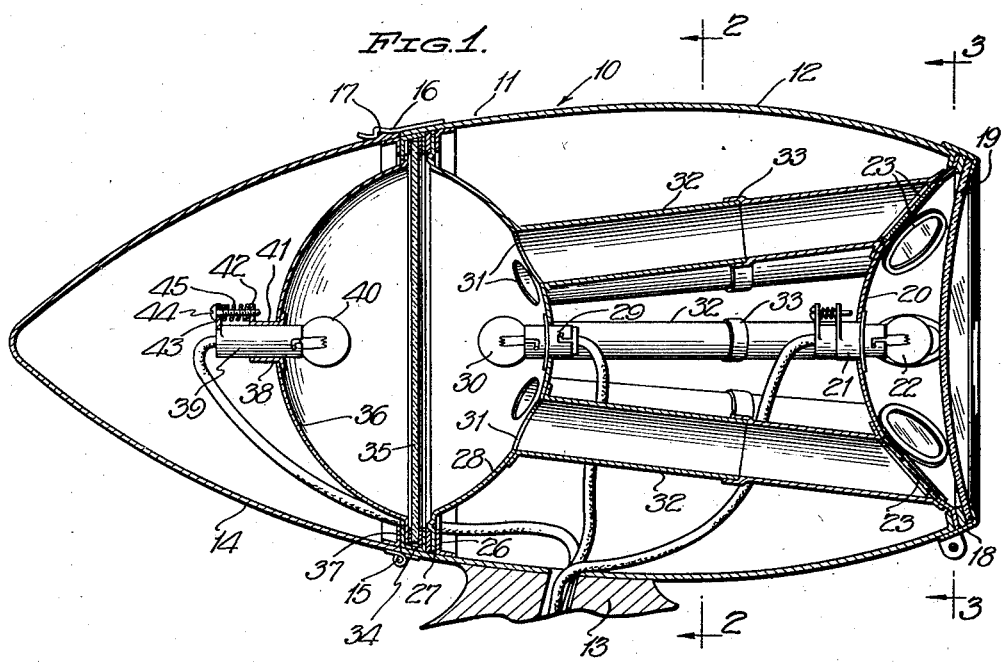
Figure 1 is a vertical longitudinal sectional view through my improved headlight.
Figure 2:
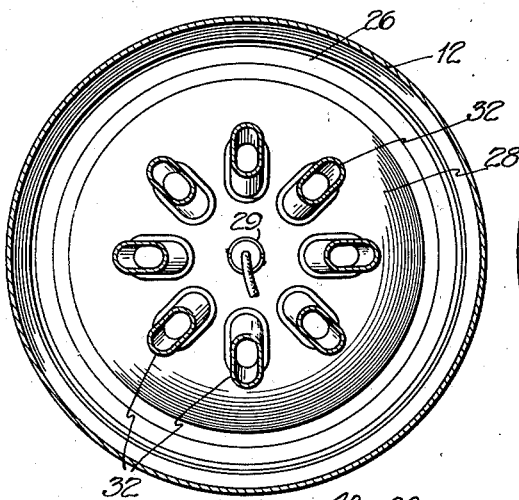
Figure 2 is a vertical transverse sectional view on the line 2—2 of Figure 1.

Referring to the drawing by reference characters, the numeral 10 designates my improved headlight in its entirety which includes a casing 11 of streamline design from front to rear. The casing 11 embodies a front stationary body section 12 mounted on a pedestal or other support 13, and a rear section 14 hinged at the bottom to the front body section 12 as at 15. A spring catch 16 carried by the top of the front body section 12 engages a shoulder 17 on the rear section 14 to normally hold the pivoted rear section closed against the rear end of the front section.

Figure 3:
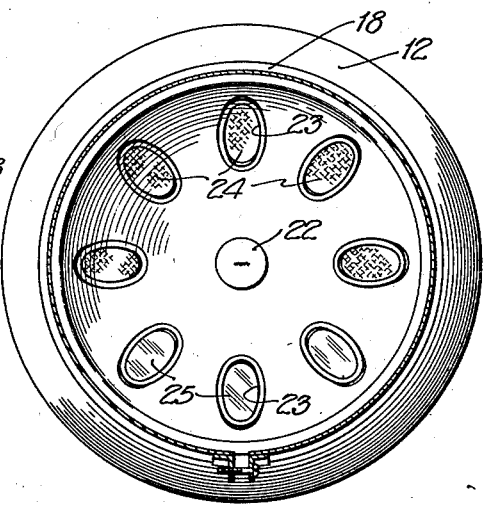
Figure 3 is a vertical transverse sectional view on the line 3—3 of Figure 1.

Mounted in a removable ring 18 fitted to the open front end of the front casing section 12 is a concavo-convex clear glass lens 19 and an inwardly disposed parabolic reflector 20, the same having a central opening in which an electric lamp socket 21 is mounted, the socket having an electric lamp 22 fitted therein. The reflector 20 is provided with a series of oval shaped openings 23, which are radially arranged and disposed adjacent the outer periphery thereof. Eight of such openings 23 are provided in equi-distantly spaced relation as best seen in Figure 3 of the drawing. The openings 23 on and above the horizontal plane of the axis of the reflector are closed by colored glass plates 24 preferably amber in color, while those below said plane are closed by clear glass plates 25.

The interior of the casing section 12 adjacent the rear open end thereof is provided with a fixed abutment ring 26 against which the peripheral flange 27 of a parabolic reflector 28 abuts. The reflector 28 faces rearwardly and is provided with a central opening in which an electric lamp socket 29 is fitted and which supports an electric lamp 30. The reflector 28 is provided with a series of oval shaped openings 31 corresponding to the number of openings 23 in the reflector 20 and alined on the same radial plane but inwardly offset relative to the horizontal planes of said openings 23. Secured to the convex side of the reflector 28 and in register with the oval shaped openings 31 are oval shaped tubes 32, the other ends of said tubes being secured to the rear convex side of the reflector 20 in register with corresponding radially alined openings 23. The tubes 32 are disposed in forwardly diverging relation from the reflector 28. For the sake of assembly and disassembly, the tubes 32 are each constructed of a pair of tube sections having telescopic engagement with each other at their meeting ends as at 33.

Frictionally fitting within the rear end of the casing section 12 and abutting the flange 27 of the reflector 28 is a mounting ring 34 which is U-shape in cross section and which rigidly supports a flat clear glass plate 35 and a parabolic reflector 36, the latter facing in the direction of the concave side of the reflector 28, so that the reflectors 28 and 36 are disposed in confronting relation with the glass plate 35 interposed therebetween. The mounting ring 34 is securely held in position when the rear casing section 14 is closed by a flange 37 provided adjacent the open front end of the said casing section. The reflector 36 is provided with a central opening 38 within which an electric lamp socket 39 is mounted, the said socket containing an electric lamp 40 which faces the electric lamp 30.

The sockets 21 and 39 are adjustably supported in the respective reflectors 20 and 36 and a description of one of the adjusting means will suffice for the other. Each of the adjustable sockets is slidably supported in a sleeve bushing 41 rigidly secured to the reflector, the bushing having an ear 42 at its rear end. The rear end of each socket is likewise provided with an ear 43 disposed in spaced alinement with respect to the ear 42. An adjusting screw 44 passes freely and forwardly through the ear 43 and threads into a threaded opening in the ear 42, the head of the screw abutting the ear 43 at all times. A tension spring 45 encircles the screw 44 and is interposed between the ears 42 and 43. Thus it will be seen that by manipulating the screws 44 associated with the rear lamp 40 and front lamp 22, the said lamps may be moved back and forth to effect a focusing adjustment thereof.

Figure 4:
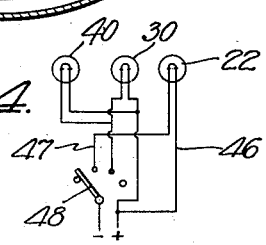
Figure 4 is a diagrammatic view of the electric lamp circuit.

The electric lamp 22 is used for clear night driving and as shown in Figure 4, the same is arranged in an electric lighting circuit 46 whereas the lamps 30 and 40 are used for driving in fog and are arranged in parallel in an electric lighting circuit 47. A switch 48 which may be located upon the dash board of a motor vehicle is common to the selective opening and closing of the circuits 46 and 47.

In practice, for driving at night with clear visibility the lamp 20 is lighted and the headlight functions the same as the conventional automobile headlight. However, should foggy atmospheric conditions exist, the lamp 20 is shut off and the lamps 30 and 40 illuminated. The confronting reflectors 28 and 36 coact to provide an enclosed light chamber, the light from which is reflected through the light tubes 32. Thus the colored glass plates 24 will project colored beams of light forwardly mixed with the clear beams projected from the clear glass plates 25, but the result will be a modified colored beam. By arranging the light tubes in outwardly diverting relation from the light chamber there will be less diffusion of light resulting in greater concentration of the light through the tubes.

While I have shown and described what I consider to be the preferred embodiment of my invention, I wish it to be understood that such changes and alterations as come within the scope of the appended claims may be resorted to if desired.

Having thus described the invention, what I claim as new and desire to secure by Letters Patent of the United States, is:—

1. A headlight comprising in combination, a casing, a pair of confronting reflectors mounted rearwardly within said casing and coacting to provide a light chamber, a lamp mounted in each reflector, a third reflector mounted in the front of said casing, a lamp mounted in the third reflector, inwardly converging tubes of substantially oval shape in cross section connecting the foremost reflector with the intermediate reflector and opening through said reflectors for transmitting light forwardly from said light chamber when the lamps therein are illuminated, and oval glass plates mounted in the front ends of said tubes.

2. A headlight comprising in combination, a casing having a reflector mounted in the front end thereof and a lamp centrally mounted on said reflector, a pair of confronting parabolic reflectors mounted within said casing rearwardly of the front reflector and in spaced relation thereto and coacting to provide a light chamber, illuminating lamps in said light chamber, a series of radially arranged inwardly converging light tubes of substantially oval shape in cross section connecting the front reflector with the next rearwardly adjacent reflector for transmitting light forwardly from said light chamber, and colored glass plates mounted on the front ends of those light tubes disposed above the plane of the horizontal axis of the front reflector.

3. In a headlight, a front reflector, a pair of parabolic reflectors arranged in confronting relation and disposed rearwardly of said front reflector to provide a light chamber, a flat glass plate mounted between said reflectors, an electric lamp mounted centrally in each parabolic reflector, and a circular series of radially arranged outwardly diverging light transmitting tubes of substantially oval shape in cross section extending from the foremost said pair of reflectors and opening through the front reflector for transmitting individual beams of light originating in and reflected from said light chamber.

JOSEPH MALY.